R. B. MACNISH.
ELECTRICAL SYSTEM FOR MOTOR DRIVEN VEHICLES, MOTOR BOATS, &c.
APPLICATION FILED SEPT. 9, 1910. RENEWED NOV. 30, 1917.
1,278,183.
Patented Sept. 10, 1918.
3 SHEETS—SHEET 1.
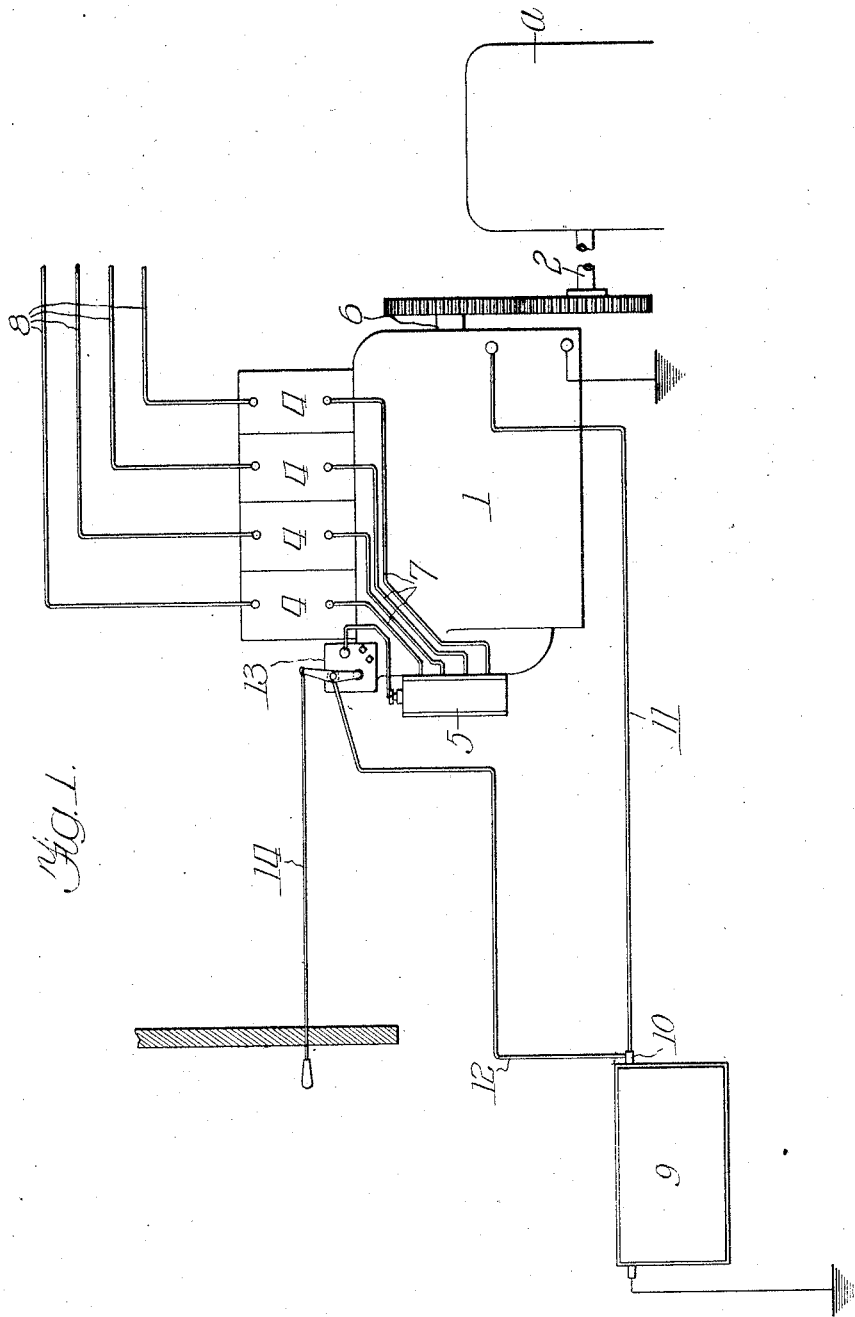
Witnesses:
Robert N. Weir
George L. Chindahl
Inventor:
Ralph B. Macnish
By Luther L. Miller, Atty.

R. B. MACNISH.
ELECTRICAL SYSTEM FOR MOTOR DRIVEN VEHICLES, MOTOR BOATS, &c.
APPLICATION FILED SEPT. 9, 1910. RENEWED NOV. 30, 1917.
1,278,183.
Patented Sept. 10, 1918.
3 SHEETS—SHEET 2.
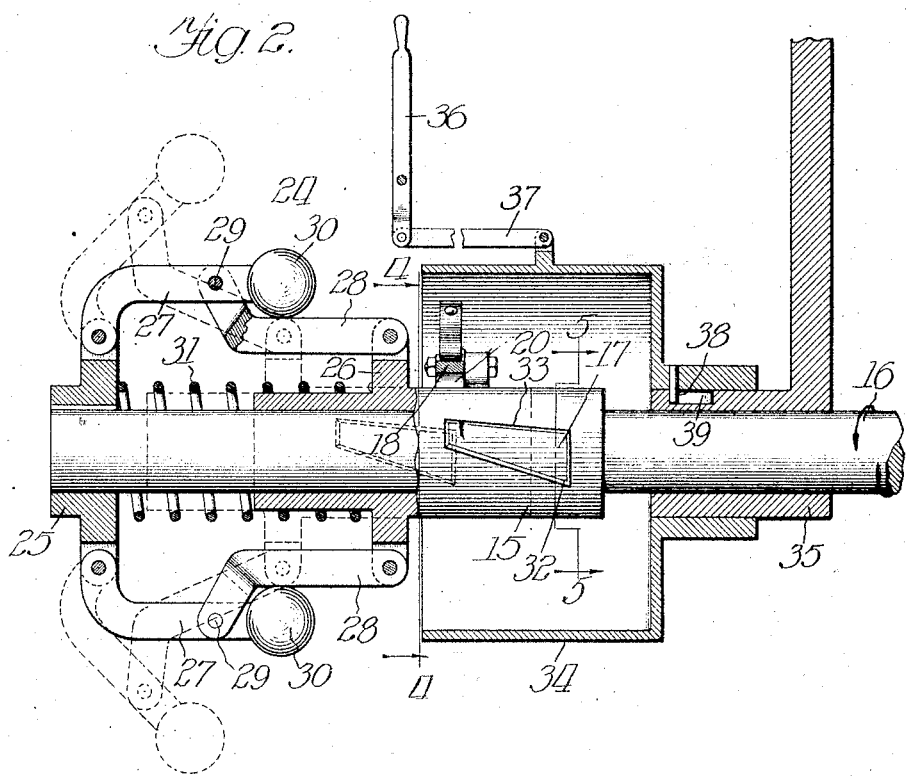
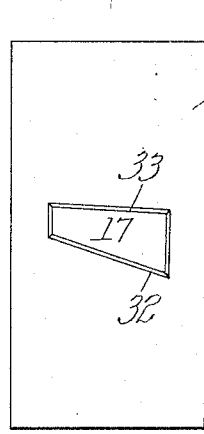
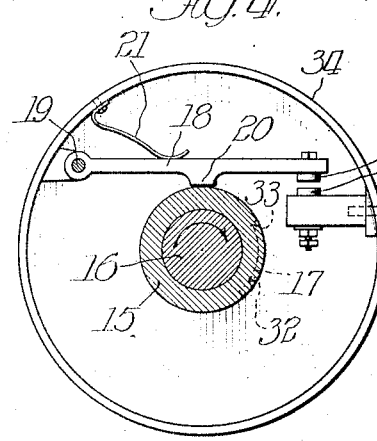
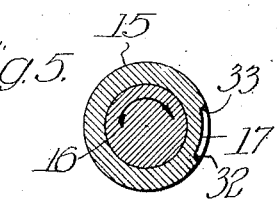
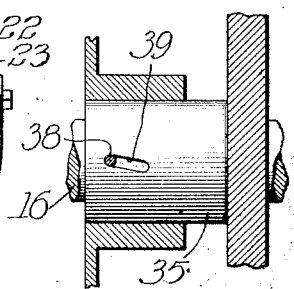

R. B. MACNISH.
ELECTRICAL SYSTEM FOR MOTOR DRIVEN VEHICLES, MOTOR BOATS, &c.
APPLICATION FILED SEPT. 9, 1910. RENEWED NOV. 30, 1917.
1,278,183.
Patented Sept. 10, 1918.
3 SHEETS—SHEET 3.
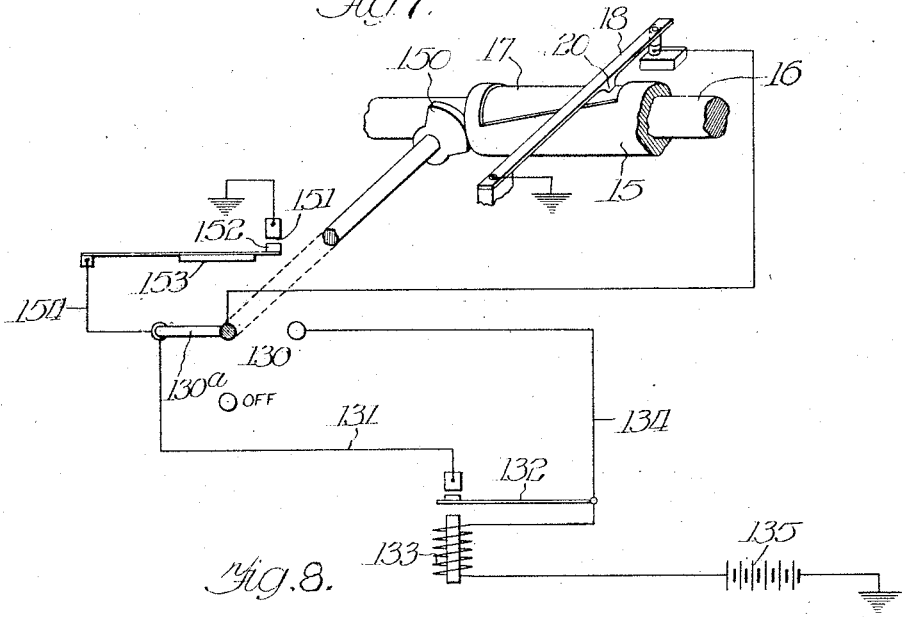
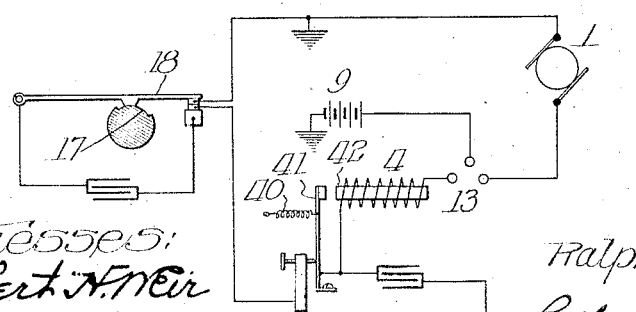
Witnesses:
Robert N. Weir
George L. Chindahl
Inventor:
Ralph B. Macnish
Luther L. Miller Atty.

UNITED STATES PATENT OFFICE.

RALPH B. MACNISH, OF BUFFALO, NEW YORK.

ELECTRICAL SYSTEM FOR MOTOR-DRIVEN VEHICLES, MOTOR-BOATS, &c.

1,278,183. Specification of Letters Patent. Patented Sept. 10, 1918.

Application filed September 9, 1910, Serial No. 581,260. Renewed November 30, 1917. Serial No. 204,785.

*To all whom it may concern:*

Be it known that I, RALPH B. MACNISH, a citizen of the United States, residing in Buffalo, county of Erie, and State of New York, have invented certain new and useful Improvements in Electrical Systems for Motor-Driven Vehicles, Motor-Boats, &c., of which the following is a specification.

One of the objects of this invention is the production of an electrical system for motor-driven vehicles and motor boats adapted to supply current for engine ignition, for lighting and for other purposes.

Another object of the invention is to provide a compact or unity arrangement of a direct-current generator, the coil or coils of an induction system of ignition, and the circuit breaker, or timer and distributer, and battery for such a system.

A further object of the invention is to provide means for automatically breaking the electrical connection between the ignition apparatus and the source of electrical energy when the engine is stopped, in order to prevent the waste of current that occurs when the operator fails to disconnect the ignition apparatus from the source of electrical energy.

A further object is to provide means whereby the loading time of the induction coil or coils, or other secondary-current-producing means may be lengthened when the source of electrical energy has become so nearly exhausted as to render such increase necessary or desirable.

In the accompanying drawings, Figure 1 is a diagrammatical view of an electrical system embodying certain features of my invention. Fig. 2 is a view of a governor-controlled timer, embodying other features of my invention. Fig. 3 is a plane development of the rotary cam comprised in said timer or circuit breaker. Fig. 4 is a section on line 4—4 of Fig. 2. Fig. 5 is a sectional view taken on line 5—5 of Fig. 2. Fig. 6 is a detail of parts shown in Fig. 2. Figs. 7 and 8 are diagrams of some of the circuits and mechanical elements.

In the diagrammatical view, Fig. 1, there is indicated at 1 a direct-current generator, as, for example, a direct-current dynamo-electric machine, or a direct-current magneto-electric machine, driven in any suitable manner, as, for instance, from the shaft 2 of the engine *a* of the car or boat, the driving connection being obtained, preferably positively, in any suitable manner, as, for example, by means of gearing 3, whereby the speed ratio of the generator shaft to the engine shaft is maintained constant. The current generated by the machine 1 may be applied to any desired use upon the car, as to energize an induction coil or coils in the ignition apparatus. In the present instance, the engine may be assumed to comprise four cylinders, four individual coils 4 being provided. These coils are located and supported upon the framework of the machine 1. The coils 4 may be of any suitable construction, and either vibrating or non-vibrating, but preferably the former. The primary windings of the induction coils 4 may be successively connected with the current-supplying circuit by means of a timer or circuit-breaker 5 of any common or preferred construction; the device 5 constituting a distributer to distribute current to the primary windings of the individual induction coils 4. The timer is driven in a suitable manner, as, for example, directly from the armature shaft 6 of the generator 1. The connections between the coils and the timer structure may be made in any suitable manner, but preferably in such a way as to avoid the numerous troubles due to the use of wiring, such as short-circuits, breakage of wires, and loose connections. Instead of using wires, I preferably employ copper leads or bus-bars (indicated diagrammatically at 7) so arranged and protected as to obtain and preserve perfect insulation, and whereby the connections between the timer and the coils are protected against mechanical shock, abrasion, and breakage. The heavy metal leads connecting the secondary wiring of the coils 4 to the spark plugs (not shown) are indicated at 8.

At a suitable point upon the car or boat is placed a storage battery or accumulator 9 of any suitable type, one terminal 10 of said battery being connected in the generator circuit by connections indicated at 11 12. If, as shown in Fig. 1, the battery is not a part of the unitary structure formed by the generator, the timer, and the coils, the battery is preferably connected in circuit by means of copper leads 11 12 built into the car. The opposite terminal of the battery may be connected to ground as shown. The connection 12 of the battery extends to a switch 13 of any common or preferred form. The switch in previous construction has been mounted upon the dash in order to be conveniently accessible to the operator, but when so located it is necessary to provide an electrical connection between the switch and the timer. Such electrical connections being a prolific source of trouble, I prefer to obviate the necessity of using them, and to that end, I mount the switch upon a suitable part of the unitary structure formed by the generator, induction coils, etc., and provide a mechanical operating connection of suitable form, as, for example, a rod 14 operatively connected to the switch and extending to a suitable point upon the dash.

So far as concerns the combination of parts of the system into a unitary structure, the timer or circuit-breaker may be of any common or suitable type. One feature of my invention, however, relates to the production of means associated with the timer or circuit-breaker, whereby the closed circuit period of the induction coil or coils is maintained constant despite variations in engine speed, or is caused to vary in any desired degree. A single-spark timer for use with any constant-voltage source of current supply, such as a storage battery, must be provided with means for keeping the closed circuit period of the coil approximately constant, if the timer is to be used to the best advantage on engines whose speed varies within wide limits, as is the case with automobile and motor-boat engines. In the case of the magneto, the conditions are altogether different. The primary current in the magneto comes in the form of a wave, the timer being adjusted to close the circuit at a certain point in the wave, and to break the circuit as nearly as possible when the wave is at the maximum. The magneto timer closes for a certain invariable fraction of a turn of the armature so as to keep in step with the number of degrees comprised in the usable part of the current wave. While such a timer as is used on magnetos can be made to work with a battery current, and has been largely used on motor-cycles, it is out of the question to expect the best results on any engine whose speed varies to any large amount. If the timer is so made that the closed circuit period is right for the lowest engine speed, there will be a gradually weakening spark as the engine speed increases. If the timer is so made that the closed circuit period is right for the maximum engine speed, there will be a great waste of current at the lowest speed without any increase in the size of the spark, since the current that flows through the coil after it is saturated is wasted in ohmic resistance. The quicker break as the speed increases tends to strengthen the spark, but this strengthening effect does not neutralize the weakening effect of an insufficient closed circuit period. To remedy this difficulty I provide means whereby the length of the arc of contact at the timer or circuit-breaker is increased directly or in any desired ratio as the speed increases, whereby the closed circuit period remains constant, or changes in any desired ratio, and whereby, with constant pressure like that from a storage battery, the spark is of the same or any desired intensity at all speeds. This means comprises a governor, preferably centrifugal, arranged to act upon one of the timer elements, as, for example, the cam, so that the number of degrees of rotation between the closing and the opening of the timer points will vary directly or in any desired ratio with the speed.

The timer cam is herein shown as formed upon a sleeve 15 which is slidable longitudinally of a shaft 16 driven from the engine. The cam portion consists, in this instance, of a depression 17 in the periphery of the sleeve 15. A lever 18 herein shown as pivotally supported at 19 is provided with a shoe 20 adapted to ride upon the sleeve 15, a spring 21 holding said shoe in contact with the sleeve. The lever 18 carries a contact point 22 adapted to engage a stationary contact 23.

In order to vary the length of the arc of contact between the cam 17 and the shoe 20 in accordance with variations in the engine speed, I provide means for obtaining relative movement between the two elements of the timer or circuit-breaker. In the construction illustrated in the drawings, the cam is the movable element, and it is arranged to be slid longitudinally of the shaft 16 by means of a governor 24. That form of governor which has been selected to illustrate the invention comprises a collar 25 fixed upon the shaft 16, a flange 26 formed upon the sleeve 15, and two pairs of arms 27 and 28 pivoted to said collar and flange, respectively, said arms being pivotally connected together at 29. Each of the arms 27 is provided with a weight 30. As the shaft 16 rotates, centrifugal force causes the weights 30 to move outwardly, thereby sliding the sleeve 15 toward the fixed collar 25, such movement being resisted by any common or preferred spring means, such as a spring 31.

The cam 17 extends longitudinally of the sleeve 15 and varies in width, the narrower portion of the cam being alined with the shoe 20 when the shaft is turning at a low rate of speed, and the wider portions of the cam being moved by the governor 24 into alinement with the breaker shoe as the rotative speed of the shaft 16 increases. This difference in the width of the cam is obtained by suitably inclining or contouring the leading edge 32 of the cam. It will be seen that by means of the specially contoured cam 17 the length of the arc of contact between the cam and the breaker shoe is varied in direct proportion to the variations in engine speed, or in the proportion desired, whereby the closed circuit period of the induction coil or coils remains constant, or is varied in any desired degree.

In order to obtain an automatic advance or retardation of the spark in accordance with the alterations in the engine speed, the tripping edge 33 of the cam 17 is inclined as shown in the drawings. I thereby obtain an automatic adjustment of the spark to the engine speed without any added parts or extra complication.

When a source of electrical energy, such as a battery of dry cells, is used, it is desirable to provide means whereby when the battery is nearly exhausted the remaining energy may be effectively utilized. I therefore provide means whereby the closed circuit period of the induction coil or coils may be lengthened when the battery is nearly exhausted. This result I accomplish by shifting one of the timer elements with relation to the other, as, for example, by shifting the breaker-lever relatively to the cam. To this end, the lever 18 and the contact 23 are mounted upon a support 34 which is arranged for movement longitudinally of the shaft 16 and the cam 17. Herein I have shown the support 34 as slidable upon a stationary portion 35 of the rigid framework. A means for manually shifting the support 34 is indicated by the numerals 36 and 37. It will be seen that when the support 34 is shifted to the right, Fig. 2, the length of the arc of contact between the cam and the breaker shoe (and consequently the closed circuit period of the coil or coils) will be increased, and that movement of the support 34 in the opposite direction will shorten the closed circuit period to the normal length.

In order that such adjustment of the closed circuit period as has just been described may not disturb the setting of the spark advance, the breaker shoe 20 is made to revolve as it shifts, the extent of revolution being in accordance with the degree of spark advance. In the present embodiment I obtain such compensational rotation of the breaker shoe by providing a pin and slot connection between the support 34 and the fixed framework that carries it, a pin 38 being fixed to the support 34, and a slot 39 being formed in the part 35, said slot being inclined or curved as shown in Fig. 6.

It is important in any battery system of ignition, and in any mageto system using a starting battery, that a vibrating spark be obtainable for starting and testing purposes and for warning the operator by a buzzing sound when the battery has been left in circuit with the engine standing. The main switch may therefore be of the construction indicated diagrammatically at 130 in Fig. 7.

In one of the closed positions (that used for starting and testing) a circuit 131 is closed through the vibrator 132 of the coil 133, while in the running position the switch blade 130ª closes a circuit 134 around the vibrator. 135 represents a source of electrical energy, one pole of which is connected to the primary winding of the coil 133, the other pole being shown herein as grounded.

The change from vibrating spark to single spark may be obtained automatically by a suitable construction of the induction coil and its vibrator. The tension of the vibrator spring 40 (Fig. 8), the distance of the vibrator tongue 41 from the core 42, the characteristics of the coil, and the closed circuit period at the timer cam are so adjusted that above a predetermined minimum engine speed the closed circuit period of the coil is too short to allow the coil to build up sufficiently to break the circuit at the vibrator. It will thus be seen that when the engine is running above the predetermined minimum speed a single spark occurs when the timer breaks the circuit, and that below this speed the vibrator comes into action. The timer cam 17 is so shaped that the spark will be properly timed when the vibrator is acting.

In some cases, as, for instance, when non-vibrating coils are used, it is desirable to arrange the system so that when the car is stopped the coils shall be automatically disconnected from the source of electrical energy. For this purpose the cam 17 and the breaker shoe 20 are so arranged that when the shaft 16 is idle, the cam 17 is so far out from under the breaker shoe that said shoe is supported upon the periphery of the sleeve 15, whereby the breaker contacts 22 and 23 are held separated. By this means I prevent the waste of current that occurs when the car is standing and the operator fails to open the circuit.

When the cam and the breaker shoe are so arranged that the cam is out of operative relation to the shoe when the engine is standing, it is necessary to provide means to establish such operative relation when the engine is to be started by cranking it or otherwise. I therefore provide some such means as a cam 150 fixed upon the shaft of the main switch, for example, the switch 130, and arranged to slide the cam sleeve 15 into such position that when said sleeve is revolved in starting the engine, the cam 17 shall operate the lever 18. As shown in Fig. 7, the sleeve 15 is thus slid when the switch blade 130ª is moved to the starting position. When the switch blade 130ª is placed in the running position, the cam 150 releases the sleeve 15 to the action of the governor. It will be seen that the movement of the sleeve 15 to the starting position is accomplished automatically when the switch is placed in starting position.

When starting " on the spark," the coil 133 (Fig. 7) may be grounded by means automatically actuated in the operation of the switch 130. 151 indicates a grounded contact; 152 a coöperating spring contact; 153 a suitably insulated member attached to the contact 152 and located in position to be moved by a member carried by the switch shaft, as, for example, the blade 130ᵃ; and 154 a connection between the contact 152 and the connection 131. When the switch is moved to starting position, the blade 130ᵃ moves the contact 152 against the contact 151, thus grounding the coil. It will be seen that the arrangement just described obviates the necessity of closing the starting circuit directly by hand through a push-button, as has heretofore been the practice.

By means of such a switch as that indicated at 130, operated by a mechanical connection such as 14, the operator is enabled to control the ignition apparatus by means of a single device, and the necessity for electrical connections extending to the dash is obviated.

In some circumstances it is desirable to provide means for automatically cutting out the ignition apparatus at maximum speed. This result may be obtained by arranging the cam 17 and the breaker shoe 20 so that when the shaft 16 reaches a predetermined speed, the cam will have been moved so far out from under the breaker shoe that said shoe rests at all times upon the periphery of the cam. The contacts 22 and 23 are thereby held separated until the engine speed is reduced sufficiently to permit the cam to move into operative relation with the breaker shoe. This means is of special value in connection with commercial cars in order to prevent the driver from running the engine at excessive speed.

The arrangements shown in Figs. 2 to 6 are largely diagrammatic, the mechanical details illustrated being susceptible to considerable modification. In Figs. 7 and 8 the secondary winding of the induction coils has been omitted for the sake of clearness.

It will be understood that while the timer or circuit-breaker shown in Figs. 2 to 6 comprises a single pair of contacts, the principle of said timer may be embodied in timers adapted for use with multiple-cylinder engines provided with an individual coil for each cylinder.

In present motor-boat and motor-car operation, engine speeds almost always vary at least as much as six to one, and ratios as high as ten to one are not at all uncommon, the tendency being toward still greater speed ranges. There are no variable-speed gas engines in use whose working speeds vary in as low a ratio as two to one, unless we except some heavy-duty, very low-speed marine engines which are occasionally throttled down below their normal speed for very short periods of time. In some of the claims I have used the term, "a variable-speed engine," by which term I intend to designate engines the speed range of which is considerable, and not engines whose range is so limited as to be negligible.

It will be noted that I employ only one timer, and that by suitably controlling said timer I am able to maintain the closed circuit period of the induction coil constant, notwithstanding the range of speed of the engine is considerable. The single governor-controlled timer hereinbefore described is not limited to a small speed range, or to any particular speed range, but is adapted for use in connection with an engine having a speed range as large as may be desired. Said timer is of course suitable for use with stationary or any other internal-combustion engines having a considerable speed range.

I claim as my invention:

1. In a vehicle or boat, the combination of a current generator; a timer mounted on a shaft of said generator; an induction coil, said timer controlling the passage of current to said coil; a battery arranged to be charged by said generator and to deliver current to said coil; a switch adapted to connect said battery to the generator and to the coil, said switch being arranged adjacent to said generator; and a mechanical connection extending between said switch and the dash-board for operating said switch.

2. The combination of a current generator; means for producing a secondary current; a circuit closer controlling the passage of current to said secondary-current-producing means; a storage battery arranged to be charged by said generator and to furnish current to said secondary-current-producing means; a circuit including said battery and said secondary-current-producing means; and means for automatically rendering said circuit closer inoperative as the armature stops.

3. The combination of a variable speed engine an induction coil, a source of current supply, a circuit connecting said source and the coil, a circuit breaker controlling said circuit and actuated by the engine, a distributer connected to the secondary of the coil and actuated by the engine, and engine-speed-controlled means for maintaining constant the closed-circuit period of the coil, and additional means for adjusting the time of continuation of said period while said circuit-breaker is in operation.

4. The combination of an internal combustion engine; a current generator; an induction coil; a circuit closer controlling the passage of current to said coil; a battery; means for automatically rendering inoperative said circuit closer as the armature of said generator stops; and additional means for controlling the passage of current to said coil.

5. In a vehicle or boat, an electric lighting and ignition system comprising an internal combustion engine; a current generator located in front of the dash adjacent the engine; an operating switch, a timer, and an induction coil mounted on said generator; all of said members being compactly grouped and connected together so as to be electrically operative and to form a unitary structure; a driving connection between the engine and the generator, and a mechanical connection extending from the dash to said switch for operating the switch.

6. The combination of an internal combustion engine; a battery; an induction coil; a circuit closer, automatic means for maintaining constant the closed circuit period of said circuit closer and for varying the time with relation to the rotation of the shaft on said engine when said circuit closer operates; and additional manual means for varying the closed circuit period of said circuit closer while maintaining constant the time with relation to the rotation of the shaft on said engine when said circuit-closer operates.

7. In a vehicle or boat, the combination of a current generator; means for producing a secondary current for ignition purposes; a battery arranged to be charged by said generator and to deliver current to said secondary-current-producing means; a timer controlling the passage of current to said secondary-current-producing means; a switch adapted to connect said battery to the generator and to the secondary-current-producing means, said switch being arranged adjacent to the generator; and a mechanical connection extending between said switch and a point within reach of the driver, for operating said switch.

8. In a vehicle or boat, an electric lighting and ignition system comprising a current generator; means for producing a secondary current for ignition purposes; a battery arranged to be charged by said generator; a timer; a switch located adjacent to the generator; bus-bars connecting the switch to the battery and to the timer; bus-bar means connecting the timer to the secondary-current-producing means; and a mechanical connection extending between the switch and a point within reach of the driver, for operating said switch.

9. An electric ignition apparatus having, in combination, a direct-current generator, a storage battery, an induction coil, a device controlling the flow of current from the generator and the battery to the coil, a switch to connect and disconnect the battery from the coil, and means for driving the generator and said device, said generator, device, coil and switch being compactly grouped together to form a single unit.

10. An electric ignition unit having, in combination, a direct-current generator, a plurality of induction coils, and a device to distribute current from the generator to the coils in succession, all of said parts being compactly grouped to form a single unit.

RALPH B. MACNISH.

Witnesses:
CLARENCE MARTIN,
SOLOMAN C. MARTIN, Jr.